US011840033B2

(12) United States Patent
Olson et al.

(10) Patent No.: US 11,840,033 B2
(45) Date of Patent: Dec. 12, 2023

(54) METHOD FOR PRODUCING CONTACT LENSES

(71) Applicant: Alcon Inc., Fribourg (CH)

(72) Inventors: Lindsay Olson, Atlanta, GA (US); Mark Neely, Alpharetta, GA (US); David Saenz Landazabal, Atlanta, GA (US); Uwe Haken, Norcross, GA (US)

(73) Assignee: Alcon Inc., Fribourg (CH)

( * ) Notice: Subject to any disclaimer, the term of this patent is extended or adjusted under 35 U.S.C. 154(b) by 342 days.

(21) Appl. No.: 16/953,600

(22) Filed: Nov. 20, 2020

(65) Prior Publication Data

US 2021/0154957 A1 May 27, 2021

Related U.S. Application Data

(60) Provisional application No. 62/940,657, filed on Nov. 26, 2019.

(51) Int. Cl.
*B29D 11/00* (2006.01)
*B29K 83/00* (2006.01)
*B29K 105/00* (2006.01)

(52) U.S. Cl.
CPC .. *B29D 11/00192* (2013.01); *B29D 11/00201* (2013.01); *B29K 2083/00* (2013.01); *B29K 2105/0061* (2013.01)

(58) Field of Classification Search
CPC .......... B29D 11/00192; B29K 2083/00; B29K 2105/0061
See application file for complete search history.

(56) References Cited

U.S. PATENT DOCUMENTS

| 4,444,711 A | 4/1984 | Schad |
| 4,460,534 A | 7/1984 | Boehm et al. |
| 5,760,100 A | 6/1998 | Nicolson et al. |
| 5,843,346 A | 12/1998 | Morrill |
| 5,894,002 A | 4/1999 | Boneberger et al. |
| 6,039,913 A | 3/2000 | Hirt et al. |
| 2001/0037001 A1 | 11/2001 | Muller et al. |

(Continued)

FOREIGN PATENT DOCUMENTS

| CN | 103465410 | * 12/2013 |
| EP | 0367513 A2 | 5/1990 |
| EP | 1224073 A | 7/2002 |

(Continued)

*Primary Examiner* — Mathieu D Vargot

(74) *Attorney, Agent, or Firm* — Sheng-Hsin Hu

(57) ABSTRACT

The invention provides a method producing contact lenses, comprising the step of: separating the mold into the male and female mold halves, with the silicone hydrogel contact lens adhered on one of the male and female mold halves; cooling the lens-adhere mold half with the molded silicone hydrogel contact lens adhered thereon; bringing a shaped ultrasonic horn in direct contact with at least one area of a non-optical surface of the female mold half or the male mold half having the molded silicone hydrogel contact lens attached thereon; and applying a ultrasonic vibrational energy to the at least one area of the non-optical surface of the female mold half or the male mold half having the molded silicone hydrogel contact lens attached thereon so as to separate the molded silicone hydrogel contact lens from the mold half attached thereon.

14 Claims, 7 Drawing Sheets

(56) References Cited

U.S. PATENT DOCUMENTS

2008/0290536 A1 11/2008 Yin et al.
2018/0169981 A1 6/2018 Liu et al.

FOREIGN PATENT DOCUMENTS

| JP | 200849480 | | 6/2008 |
| JP | 200849480 A | | 6/2008 |
| JP | 2015-066875 | * | 4/2015 |
| WO | 1987004390 A1 | | 7/1987 |
| WO | 0130558 A1 | | 5/2001 |

* cited by examiner

METHOD FOR PRODUCING CONTACT LENSES

The present invention relates to an improved method for producing contact lenses, in particular silicone hydrogel contact lenses.

BACKGROUND OF THE INVENTION

Silicone hydrogel contact lenses can be manufactured economically in large numbers by a conventional full-mold process involving disposable molds, the examples of which are disclosed in, for example, PCT patent application no. WO/87/04390, in EP-A 0 367 513 or in U.S. Pat. No. 5,894,002. In a conventional molding process, a predetermined amount of a polymerizable or crosslinkable material typically is introduced into a disposable mold comprising a female (concave) mold half and a male (convex) mold half. The female and male mold halves cooperate with each other to form a mold cavity having a desired geometry for a contact lens. Normally, a surplus of polymerizable or crosslinkable material is used so that when the male and female halves of the mold are closed, the excess amount of the material is expelled out into an overflow area adjacent to the mold cavity. The polymerizable or crosslinkable material remaining within the mold is polymerized or cross-linked by means of actinic radiation (e.g., UV irradiation, ionized radiation, microwave irradiation or by means of heating. Both the starting material in the mold cavity and the excess material in the overflow area are thereby hardened. Subsequently, the mold is opened and the polymerized but as yet unhydrated contact lens is removed and further processed.

Unfortunately, it is not possible as a rule to predict reliably to which of the two mold halves the contact lens will adhere: in some cases it adheres to the male mold half (mold half with the convex optical molding surface) and, in others, it stays in the female mold half (mold half with the concave optical molding surface). After opening of the mold, therefore, a check must be made in every case to discover on or in which mold half the polymerized but as yet unhydrated contact lens is located.

After mold separation, the lens on its respective mold half (male or female) together is subjected to extraction with an organic solvent (e.g., IPA (isopropyl alcohol)). This is done because the lens is difficult to be removed from the mold half due to a strong adhesion between the lens and the mold half. It is believed that this strong adhesion is due to the tackiness of the surface of a silicone hydrogel lens so produced. If the lens is removed from the mold half by force, the lens can adhere to itself (curl) and lens handling can be difficult and/or the lens can be damaged due to extreme surface tackiness.

After the extraction, the lens, still on the mold half, is equilibrated in water and then removed from the mold half. However, the lens still adheres onto the mold surface, thus, a solvent mixture is used to deblock (or dislodge, or delensing) the lens. The removed lens is further subjected to other process, such as, for example, plasma treatment, hydration, sterilization, etc.

In general, extraction and equilibration of lenses are carried out in batch processes. There are some disadvantages associated with each lens associated with one mold half. First, mold halves takes up valuable space in an extraction or equilibration tank and therefore reduce the capacity of extraction which can be carried out in each tank. Second, lens flashes can be partially or completely dissolve in an extraction bath. Any dissolution of lens flashes can potentially reduce extraction efficiency. Third, lens flashes may be still attached to the lens even after extraction and equilibration. Any lens with flashes attached thereto will be rejected and as such, production yield can be decreased. It would be desirable to have a step of removing, also known as "deblocking" or "dislodging" or "delensing", the lens from the lens-adhering mold half, such as, e.g., isopropyl alcohol (IPA), can be used to dislodge a silicone-hydorgel lens from its adhering mold half. The solvent swells the lens and helps reduce the forces holding the lens to the mold half surface. However, once a lens is swollen, the large size of the lens makes it difficult to handle due to lack of mechanical strength. In addition, the lens after swelling in an organic solvent (e.g., IPA) may still be sticky or tacky.

PCT published international patent application No. WO 01/30558 describes a different approach for dislodging a lens from its adhering mold half, by lowering the temperature of the contact lens with a cryogenic material to a temperature and for a time sufficient for the lens to release from its adhering mold half without the application of external forces. The lowering of the temperature of the contact lens is accomplished by direct or indirect contact with a cryogenic substance, such as liquid nitrogen, liquid helium, liquid carbon dioxide, or solid carbon dioxide ("dry ice"). In physics, cryogenics is the production and behaviour of materials at very low temperatures. According to Wikipedia, scientists define a gas to be cryogenic if it can be liquefied at or below −150° C. (123 K; −238° F.). The U.S. National Institute of Standards and Technology considers the field of cryogenics as that involving temperatures below −180° C. (93 K; −292° F.). This is a logical dividing line, since the normal boiling points of the so-called permanent gases (such as helium, hydrogen, neon, nitrogen, oxygen, and normal air) lie below −180° C. while the Freon refrigerants, hydrocarbons, and other common refrigerants have boiling points above −180° C. When a cryogenic substance is used to cool down a silicone hydrogel lens, the surface tackiness temporarily freezes. The mold half because of reduction in the tackiness and probably lens size reduction so much that the lens separate from the mold. However, the lens after separation becomes tacky again in air, which makes the lens handling difficult. In addition, use of a cryogenic substance can increases product cost significantly.

Therefore, there is a need not only to provide a process for casting—molding contact lenses with enhanced quality and enhanced yield achieved by omitting the previously required check to discover on or in which mold half the contact lens is located after the mold has been opened, but also to provide a process which permit silicone hydrogel lens to be separated from lens adhering mold half, and do not require liquid soaks.

SUMMARY OF THE INVENTION

The invention is directed to a method for producing contact lenses, comprising:
  a) providing a mold including a male mold half having a first molding surface and a female mold half having a second molding surface, wherein the male and female mold halves are configured to receive each other such that a mold cavity is formed between the first and second molding surfaces when the mold is closed;
  b) dispensing an amount of a silicone hydrogel lens-forming material into the female mold halves;
  c) mating the male and female mold halves to close the mold;

d) curing thermally or actinically the silicone hydrogel lens-forming material located in the mold cavity, thereby forming a silicone hydrogel contact lens within the lens mold;
e) separating the mold into the male and female mold halves, with the molded silicone hydrogel contact lens adhered on a lens-adhered mold half which is one of the male and female mold halves;
f) cooling the lens-adhere mold half with the molded silicone hydrogel contact lens adhered thereon to a temperature between minus five degree Celsius and fifteen degree Celsius and provided that a liquid nitrogen, liquid helium or solid carbon dioxide is not used to cool the lens-adhere mold half;
g) bringing a shaped ultrasonic horn in direct contact with at least one area of a non-optical surface of the cooled lens-adhered mold half with the molded silicone hydrogel contact lens attached thereon;
h) applying a ultrasonic vibrational energy to the at least one area of the non-optical surface of the lens-adhered mold half having the molded silicone hydrogel contact lens attached thereon so as to release the molded silicone hydrogel contact lens from the lens-adhered mold half.

The invention is also directed to an apparatus for delensing a hydrogel contact lens from the lens adhering mold half, separating a molded hydrogel contact lens from a female mold half or a male mold half attached thereon, the apparatus comprising:
means for holding the female mold half or the male mold half having hydrogel contact lens attached thereon stationary, means for cooling the lens-adhere mold half with the silicone hydrogel contact lens adhered thereon;
an ultrasonic energy horn is shaped to direct contact with at least one area of a non-optical surface of the female mold half or the male mold half having the molded hydrogel contact lens attached thereon,
a power supply, a converter and a booster coupled to the horn to form a ultrasonic welding system for generating ultrasonic energy of a frequency and amplitude, and for a duration necessary to separate the molded hydrogel contact lens from the female mold half or the male mold half attached thereon.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF PREFERRED EMBODIMENTS

Figure 1:
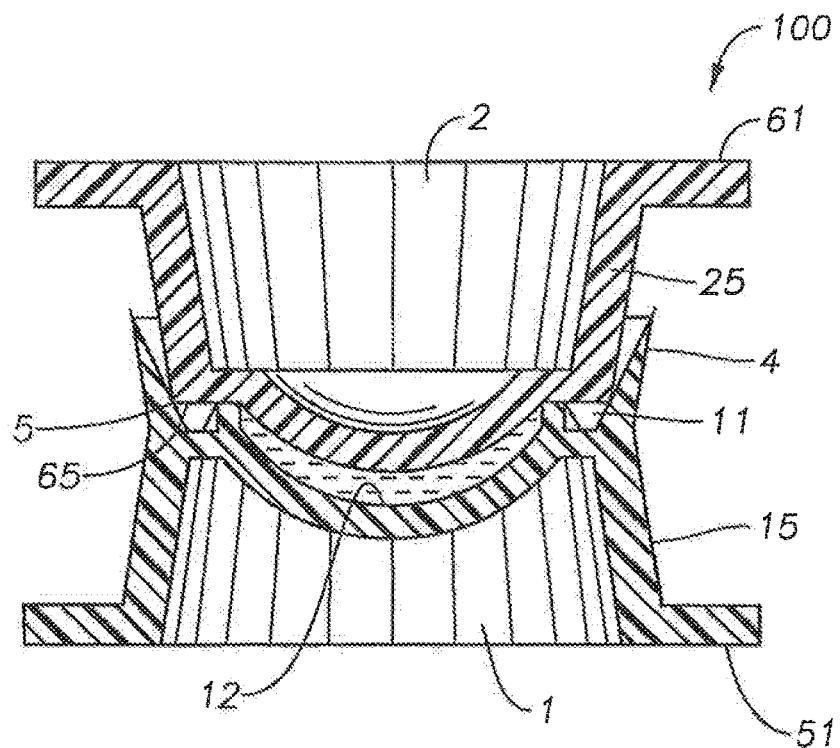
FIG. 1 is a cross-sectional view of a mold according to a preferred embodiment of the invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains ethylenically unsaturated groups and can be polymerized actinically or thermally. Medium and high molecular weight typically means average molecular weights greater than 700 Daltons.

A "polymer" means a material formed by polymerizing/crosslinking one or more monomers, macromers and or oligomers.

"Molecular weight" of a polymeric material (including monomeric or macromeric materials), as used herein, refers to the number-average molecular weight unless otherwise specifically noted or unless testing conditions indicate otherwise.

As used herein, a "prepolymer" refers to a starting polymer which can be cured (e.g., crosslinked and/or polymerized) actinically or thermally to obtain a crosslinked and/or polymerized polymer having a molecular weight much higher than the starting polymer.

A "chain-extended polysiloxane vinylic crosslinker" refers to a compound comprising at least two ethylenically-unsaturated groups and at least two polysiloxane segments each pair of which is linked by one divalent radical.

A "lens-forming material" refers to a polymerizable composition which can be cured (i.e., polymerized and/or crosslinked) thermally or actinically to obtain a crosslinked polymer. Lens-forming materials are well known to a person skilled in the art.

A "non-optical surface of a mold half" refers to mold half surface which does not contact the lens forming material during cast molding a contact lens.

The invention generally relates to a method for separating mold and dislodging (or removing or de-blocking) of a silicone hydrogel contact lens from a mold after lens curing and before lens extraction. The invention is partly based on the discovery that although use of ultrasonic vibration energy can be used to dislodge a silicone-hydrogel lens from its adhering mold half as illustrated in patent application Ser. No. 15/841,647, ultrasonic vibration energy alone may not enough for dislodge a silicone-hydrogel lens which has a sticky surface. The invention is also partly based on the discovery that the problem of dislodging a sticky silicone-hydrogel lens from its adhering mold half is solved first by cooling the lens-adhere mold half with the silicone hydrogel contact lens adhered thereon and then further use of ultrasonic vibration energy to dislodge a silicone-hydrogel lens from its adhering mold half.

Although the inventors do not wish to be bound by any particular theory, it is believed that cooling the lens-adhere mold half with the silicone hydrogel contact lens to a temperature between to a temperature between minus five degree Celsius and fifteen degree Celsius, preferably between zero degree Celsius and twelve degree Celsius, more preferably between two degree Celsius and ten degree Celsius, still more preferably between three degree Celsius and eight degree Celsius so that the cooled the lens-adhere mold half with the silicone hydrogel contact lens reduces adhesion between the silicone hydrogel contact lens and the mold half but reduction of the adhesion is not large enough to cause the silicone hydrogel contact lens to release. According to the present application, the temperature of the mold half can be measured by any suitable method, for example, by Resistance thermometers. It is also called resistance temperature detectors (RTDs), are sensors used to measure temperature. Many RTD elements consist of a length of fine wire wrapped around a ceramic or glass core but other constructions are also used. The RTD wire is a pure material, typically platinum, nickel, or copper.

If a liquid nitrogen, liquid helium or solid carbon dioxide is used to cool the lens-adhere mold half, then too much cool (much below minus five degree Celsius or even lower) may release the silicone hydrogel contact lens. According to the present application, a liquid nitrogen, liquid helium or solid carbon dioxide is not used to cool the lens-adhere mold half because it is too costly. In addition, the extreme low temperature may change the dimensional in irregular way and other properties of the silicone hydrogel contact lens.

It is believed that, due to the reduction of adhesion force between the silicone hydrogel contact lens and the mold half, and the presence of areas at which the lens is separated to the mold to some degree during demolding process (i.e. separating male mold and female mold). During an ultrasonic vibration is applied to at least one area of a non-optical surface of the female mold half or the male mold half having the molded silicone hydrogel contact lens attached thereon, these area can become large and may reach the edge of the lens. In this case, air bubbles fill the void and then the lens releases from the mold half. It is also possible that the delensing from the edge and moves towards the center. In this case, air is filling immediately the gap.

It is also believed that if an extra force and an ultrasonic vibrational energy are simultaneously applied to at least one area of the female mold half or the male mold half having the molded silicone hydrogel contact lens attached thereon, the separation of the molded silicone hydrogel contact lens from the mold half attached thereon will be efficient, for example, it takes less time to separate the molded silicone hydrogel contact lens from the mold half attached thereon will be efficient. The extra force and the ultrasonic vibrational energy may be applied at different areas or the same area of the female mold half or the male mold half having the molded silicone hydrogel contact lens attached thereon. For operation simplicity, the extra force and the ultrasonic vibrational energy are applied at the same area of the mold half. It is further believed that the extra force will deflect the mold half and generate additional micro air bubbles between the lens surface and the female mold half or the male mold half having the molded silicone hydrogel contact lens attached thereon.

There are several advantages associated with a method of the invention. First, combination of reduction of adhesion between the silicone hydrogel contact lens and the mold half and application of ultrasonic vibration energy enables a molded lens to be dislodged from its adhering mold half without tearing the lens. Second, lens dislodging by ultrasonic vibration energy is a relatively fast process, for example, taking less than a second. Third, the present process permit silicone hydrogel lens to be separated from lens adhering mold half, and do not require liquid soaks.

Fourth, without mold halves, an extraction tank can accommodate much more lenses and product cost associated with extraction equipments can be decreased. Fifth, removal of the flashes and uncured polymerizable components can increase extraction efficiency.

The present invention directs to a method for producing contact lenses, comprising:
a) providing a mold including a male mold half having a first molding surface and a female mold half having a second molding surface, wherein the male and female mold halves are configured to receive each other such that a mold cavity is formed between the first and second molding surfaces when the mold is closed;
b) dispensing an amount of a silicone hydrogel lens-forming material into the female mold halves;
c) mating the male and female mold halves to close the mold;
d) curing thermally or actinically the silicone hydrogel lens-forming material located in the mold cavity, thereby forming a silicone hydrogel contact lens within the lens mold;
e) separating the mold into the male and female mold halves, with the molded silicone hydrogel contact lens adhered on a lens-adhered mold half which is one of the male and female mold halves;
f) cooling the lens-adhere mold half with the molded silicone hydrogel contact lens adhered thereon to a temperature between minus five degree Celsius and fifteen degree Celsius and provided that a liquid nitrogen, liquid helium or solid carbon dioxide is not used to cool the lens-adhere mold half;
g) bringing a shaped ultrasonic horn in direct contact with at least one area of a non-optical surface of the cooled lens-adhered mold half with the molded silicone hydrogel contact lens attached thereon;
h) applying a ultrasonic vibrational energy to the at least one area of the non-optical surface of the lens-adhered mold half having the molded silicone hydrogel contact lens attached thereon so as to release the molded silicone hydrogel contact lens from the lens-adhered mold half.

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold.

In general, a mold comprises at least two mold sections (or portions) or mold halves, i.e. male and female mold halves. The male mold half defines a first molding (or optical) surface defining the posterior (concave) surface of a lens and the second mold half defines a second molding (or optical) surface defining the anterior (convex) surface of a lens. The first and second mold halves are configured to receive each other such that a lens forming cavity is formed between the first molding surface and the second molding surface. The molding surface of a mold half is the cavity-forming surface of the mold and in direct contact with lens-forming material.

FIG. 1 schematically illustrates a preferred mold 100 used in the methods and apparatus of the invention. The mold 100 comprises a female mold half 1 and male mold half 2.

The male mold half 2 comprises a base 61, a substantially cylindrical body 25 which extends upward from base 61, a posterior molding surface defining the posterior (concave) surface of a molded contact lens, and an annular shoulder 65 which surrounds the posterior molding surface. The posterior molding surface protrudes outward from the top of body 25. The annular shoulder 65 shown is flat. It is understood that the annular should 65 can have any suitable surface, such as, e.g., a tilted surface.

The female mold half 1 comprises a base 51, a substantially cylindrical body 15 which extends upward from base 51, an anterior molding surface defining the anterior (convex) surface of a molded contact lens, and a collar 4. The anterior molding surface recesses downward from the top of the body 15. Collar 4 (or up-protruding flange) is preferably integral part of the female mold half 1 and protrudes upward from the top of the body 15. A circumferential groove (or recess) 11 is formed on top of the body 15 between the anterior molding surface and functions as an overflow for any excess unpolymerized lens-forming material.

The term "collar" as used herein refers to a peripheral circular part which protrude upward from the top of body of one of the two mating mold halves. A collar can be attached to or preferably integral part of that mold half and which can encircle the other mold half to provide a tight seal between the two mold halves. It is understood that the collar can be provided on either of the male and female mold halves.

The female mold half 1 and a male mold half 2 are configured to receive each other such that a contact lens forming cavity 12 is formed between the anterior and posterior molding surfaces. The collar 4 encircles the body 25 of the male mold half 2 to provide a tight seal 5 between the female and male mold halves when the mold is closed. Typically, there is no lens material in the seal.

In operation, mold halves 1 and 2 can be first injection molded from a plastic resin in an injection molding apparatus, as well known to a person skilled in the art. A specific amount of a polymerizable lens-forming material is typically dispensed into the female mold half 1 by means of a dispensing device and then the male mold half 2 is put on and the mold 100 is closed (FIG. 1). As the mold 100 closes, any excess unpolymerized lens-forming material is pressed into an overflow 11 provided on the female mold half 1.

Subsequently, the closed mold 100 containing the polymerizable lens-forming material is subjected to actinic irradiation (e.g., UV radiation), at least in the region of the lens forming cavity 12. For this purpose, at least one of the mold halves is transparent to the actinic radiation (e.g., UV light) at least in the region of the molding surface. Thus, at least the polymerizable lens-forming material in the lens forming cavity 12 is polymerized. It is also possible for any polymerizable lens-forming material in the overflow 11 to be polymerized. This is advantageous in the respect that, when the mold is opened, the excess polymerized lens-forming material then remains in the overflow 11 of the female mold half 1, while the contact lens adhering to the male mold half 2 can be removed and further processed together with male mold half 2.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S.

Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, a silicone hydrogel lens-forming material comprises at least one silicon-containing monomer or macromer, or can be any lens formulations for making soft contact lenses. Exemplary lens formulations include without limitation the formulations of lotrafilcon A, lotrafilcon B, etafilcon A, genfilcon A, lenefilcon A, polymacon, acquafilcon A, balafilcon, senofilcon A, and the like. A lens-forming material can further include other components, such as an initiator (e.g., a photoinitiator or a thermal initiator), a visibility tinting agent, UV-blocking agent, photosensitizers, and the like. Preferably, a silicone hydrogel lens-forming material used in the present invention comprises a silicone-containing macromer or prepolymer.

Examples of silicone-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Examples of silicone-containing prepolymers include without limitation those disclosed in US Patent Application Publication No. US 2001-0037001 A1 and U.S. Pat. No. 6,039,913, which are incorporated herein by references in their entireties. Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In accordance with the present invention, a silicone hydrogel lens-forming material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A silicone hydrogel lens-forming material can also comprises a hydrophobic monomer. By incorporating a certain amount of hydrophobic vinylic monomer in a polymerizable fluid composition, the mechanical properties (e.g., modulus of elasticity) of the resultant polymer may be improved.

A silicone hydrogel lens-forming material can further comprise an antimicrobial agent, preferably antimicrobial metal nanoparticles, more preferably silver nanoparticles.

A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The closed mold containing the polymerizable lens-forming material subsequently is cured. A person skilled in the art knows well how to cure a lens-forming material. For example, a lens-forming material is subjected to actinic irradiation (e.g., UV radiation) at least in the region of the lens forming cavity or thermal treatment (e.g., heating in an oven) to form a lens. For actinic curing, at least one of the mold halves is transparent to the actinic radiation (e.g., UV light) at least in the region of the molding surface. Thus, at least the polymerizable lens-forming material in the lens forming cavity is polymerized. It is also possible for any polymerizable lens-forming material in the overflow to be polymerized. This is advantageous in the respect that, when the mold is opened, the excess polymerized lens-forming material then remains in the overflow of the female mold half, while the contact lens adhering to the male mold half can be removed and further processed together with male mold half.

Figure 2:
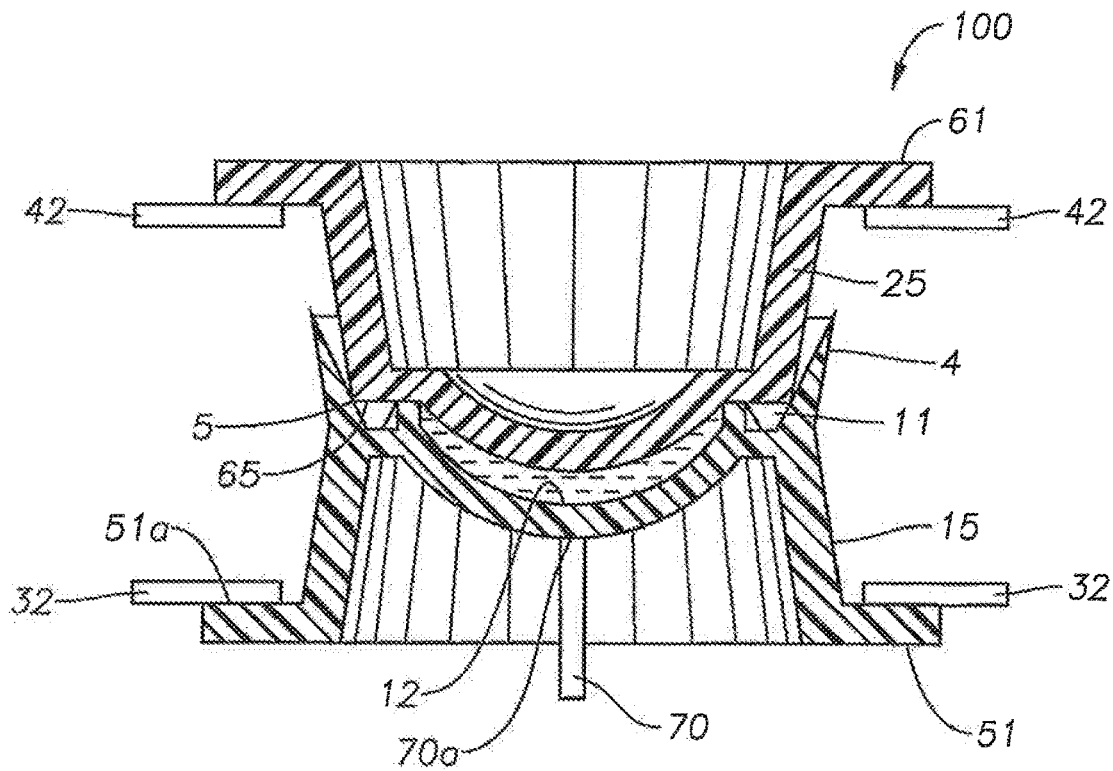
FIG. 2 illustrates schematically a process for separating the male and female mold halves of a lens-forming mold according to the invention and an apparatus for performing a method of the invention.

Subsequently, applying a force to non-optical surface of the female mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the female mold surface which breaks the bonds between the optical molding surface of the female mold and the lens, as shown in FIG. 2. Various ways of applying a force to non-optical surface of the female mold at a location about the center area of non-optical molding surface along the axis of the mold to deform the female mold surface which breaks the bonds between the optical molding surface of the female mold and the lens. It is understood that the mold-opening device can have any configurations known to a person skilled in the art for performing the function of separating two mold halves from each other. For example, referring to FIG. 2, the demolding assembly comprises a pin 70 positionable against the center area of non-optical molding surface of the female mold section. The pin 70 has a flat free end 70a to enable a surface contact between the free end 70a and the center area of non-optical molding surface of the female mold. It will be appreciated that the scope of the invention is not limited to such a particular flat configuration of the pin end 70a, for example the pin may have a rounded free end. In the present embodiment, the pin 70 is movable and the female mold remains stationary by applying a restraining force to female mold half applying a restraining force to female mold half with a first prying finger 32 for maintaining the female mold half in a fixed position. However, it is possible to arrange the assembly so that the female mold is movable and the pin 70 remains stationary, or so that both the pin 70 and the female mold can be moved relative to each other.

In use, during the demolding operation, the free end 70a of the pin 70 applies a longitudinally directed force to the central portion of the non-optical surface of the female mold. The first prying finger 32 applies a counteractive force against the end face 51a of the flange 51 of the female mold section 1. Consequently, the female mold section is compressed between the free end 70a of the pin 70 and the first finger 32. The compression force deforms the curved part of the female mold section and breaks the adhesive bond between the lens-forming optical surface of the female mold section 1 and the anterior surface of the lens 12.

Then, apply a vertical lifting movement to the male mold with a second prying finger (while maintaining the restraints on the female mold so as to effectuate gradual separation between the female mold and the male mold.

After separating the male mold and the female mold, the contact lens adheres to the male mold even though the molding surfaces of the female mold and male mold are not treated before or after dispensing a specific amount of a polymerizable lens-forming material into one of the mold halves to render the molded contact lens preferentially adhered to the female mold or male mold when separating the mold.

After breaking the bond between the optical molding surface of the female mold and the lens, the mold is separated, the molded contact lens adhering to the male mold half 2. It is surprising to find out that, according to the present invention, the molded contact lens adhering to the male mold half even though the molding surfaces of the female mold and male mold are not treated before or after dispensing a specific amount of a polymerizable lens-forming material into one of the mold halves to render the molded contact lens preferentially adhered to the female mold or male mold when separating the mold.

Once the mold sections have been separated, the lens will adhere to a surface of the male mold sections and must therefore be released from the male mold section. According to the present application as mentioned above, the lens typically remains adhered to the male mold section. However, by using similar principle, the compression can be applied to the applying a force to non-optical surface of the male mold at a location about the center area of non-optical molding surface along the longitudinal axis of the mold to deform the male mold to compress the female mold between the pin and the first set of pry fingers so as to break the bonds between the optical molding surface of the male mold and the lens, thereby the lens adhere to the female mold when separating the mold.

Figure 3:
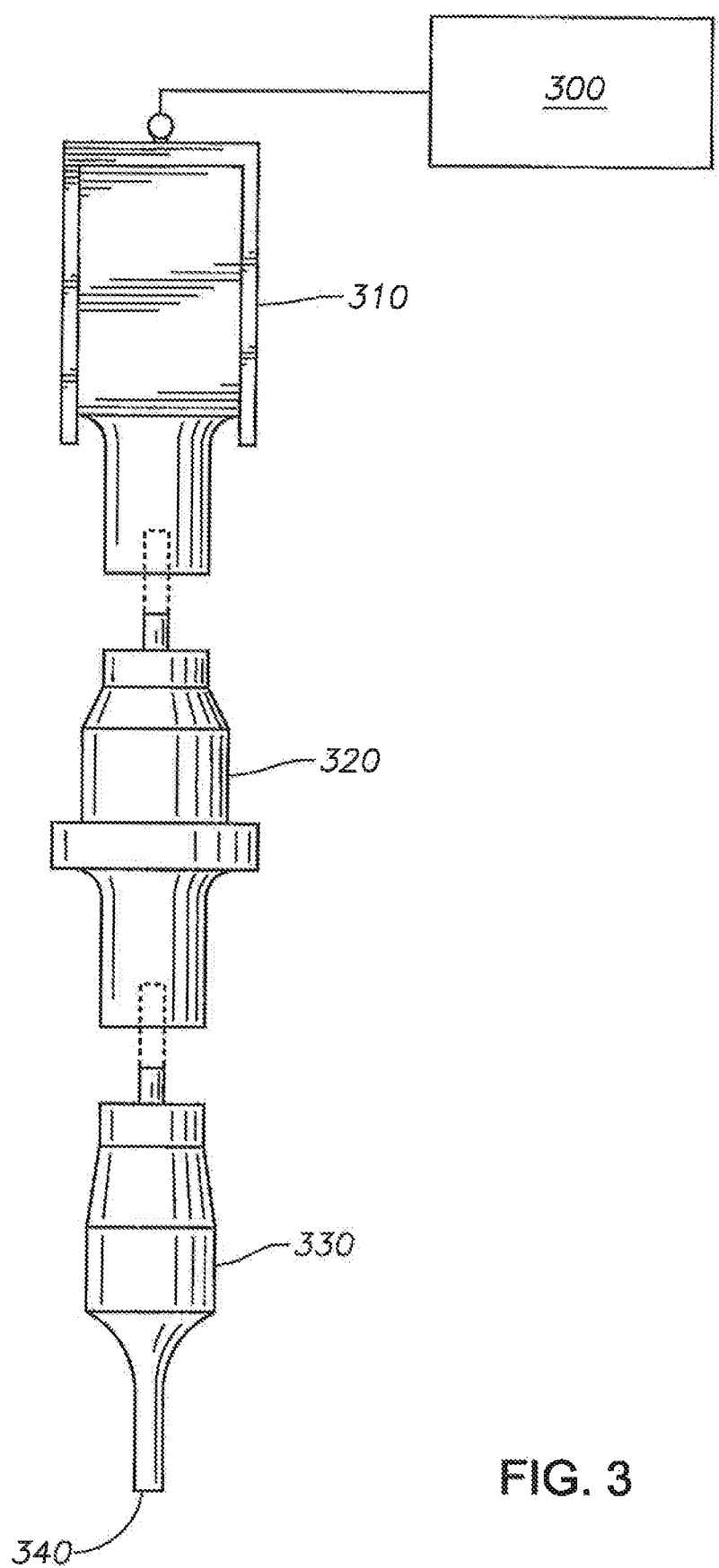
FIG. 3 illustrates an ultrasonic welding system.

According to the present application, an ultrasonic welding system is used not to welding two pieces of plastic material together but to separate molded silicone hydrogel contact lens from the mold half attached thereon. An ultrasonic welding system as illustrated in FIG. 3 comprises: a power supply (300) which provides a high power AC signal with frequency matching the resonance frequency of the ultrasonic stack. An ultrasonic stack composed of a converter (310), a booster 320) and a horn (330). All three elements of the stack are specifically tuned to resonate at the same exact ultrasonic frequency (Typically 15, 20, 30, 35, 40 or 70 kHz). The converts the electrical signal into a mechanical vibration. The booster modifies the amplitude of the vibration. The horn can also define the amplitude of vibration and apply the mechanical vibration to the parts to be contacted. However, any kind of mechanical system which transfers the vibrational energy from the conver to the mold half can be used.

Figure 4:
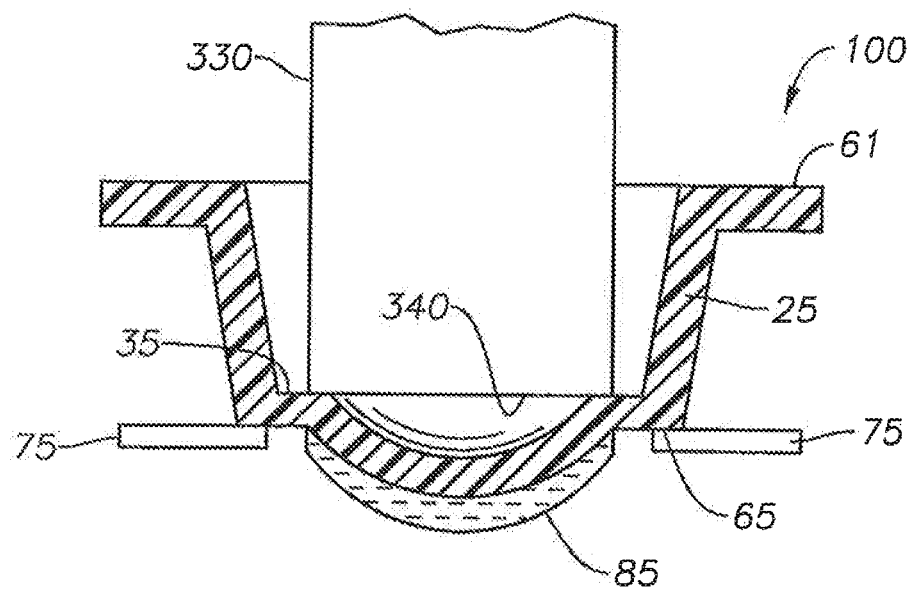
FIG. 4 illustrates a flat ultrasonic horn seated on extended flat edge surround the outer concave surface of the male mold half.

FIG. 4 illustrates an embodiment of the invention is shown wherein an ultrasonic horn (330) having a flat surface (340) is sized to be approximately the outer diameter of the male mold half (2) and seated on extended flat edge surround the outer concave surface (35) (or back surface of the annular shoulder 65) of the male mold half. The male mold half (2) proximate the ultrasonic horn vibrates with the acoustical energy emitted from the ultrasonic horn (330) while the contact lens (85) is attached thereon so that a relative motion at the frequency of the acoustic energy takes place between back surface of the annular shoulder (65) of the male mold half and the contact lens attached thereon. The male mold half and the contact lens attached thereon is held stationary by a position holder (75). A person skilled in the art knows which device can be used as a position holder, for example, a level metal or a cup having an attached level metal. The cup can be used to collect the lens separated from the male mold half. Furthermore, the cup can be attached a vacuum source and the vacuum can assist the separation of the lens from the male mold half.

Figure 5A:
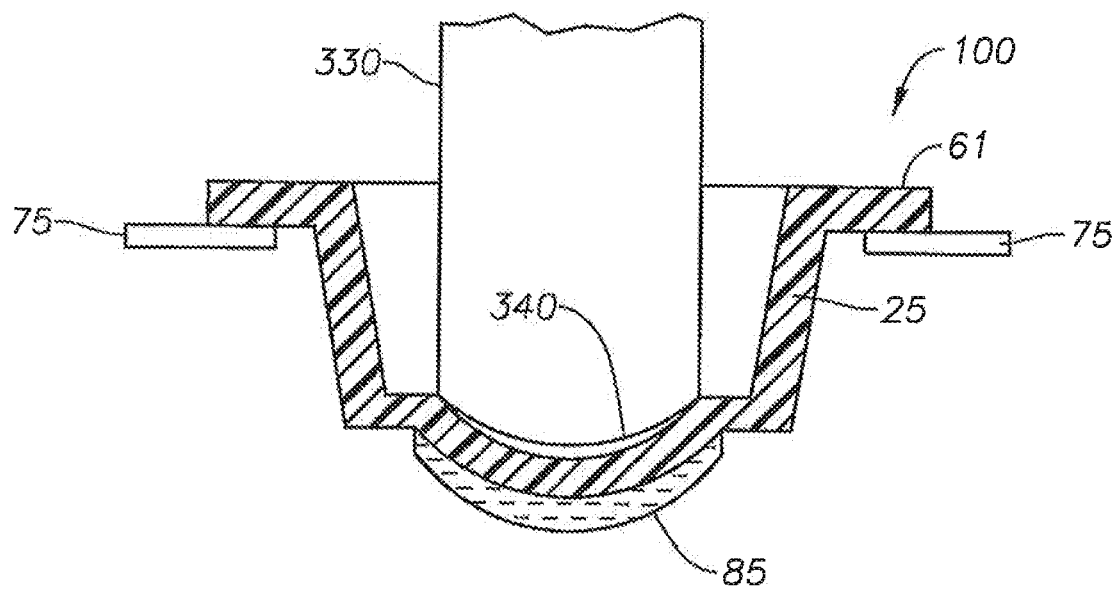
FIGS. 5A and 5B illustrate a convex ultrasonic horn is seated within the outer concave portion of male half mold half.
Figure 5B:
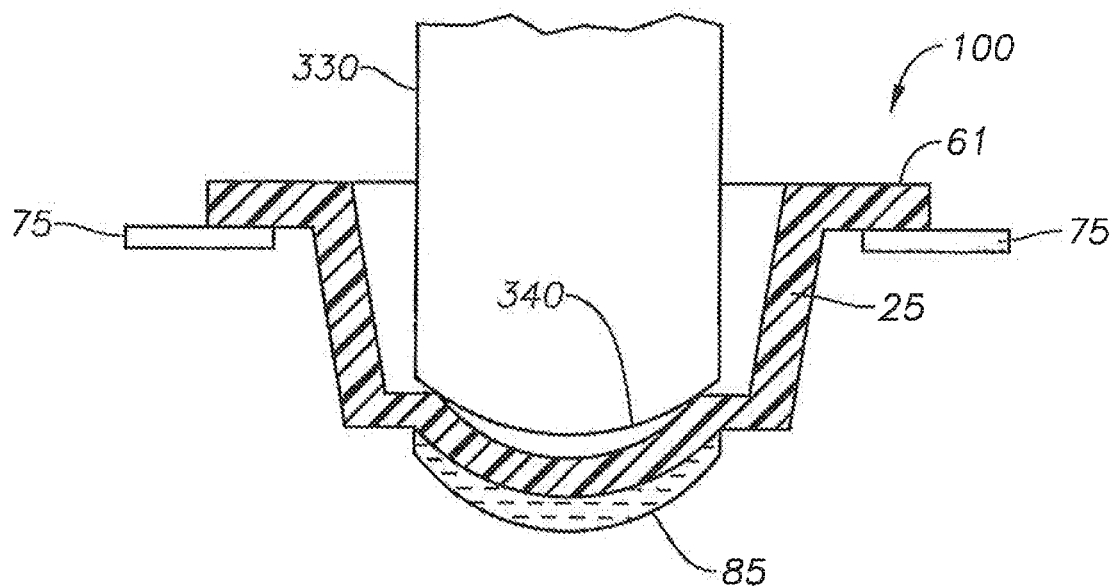

FIGS. 5A and 5B show an embodiment wherein an ultrasonic horn (330) having a convex surface (340) is of a size that allows it to extend within the outer concave portion of male half mold half (2). The male mold half and the contact lens (85) attached thereon is held stationary by a position holder (75). FIG. 5A illustrates that the ultrasonic horn vibrates with the acoustical energy emitted from the ultrasonic horn (330) while the contact lens is attached thereon so that a relative motion at the frequency of the acoustic energy takes place through contact surface between inside of the outer concave portion of male half mold half (2) and the contact lens attached thereon. 5B illustrates that the ultrasonic horn vibrates with the acoustical energy emitted from the ultrasonic horn (330) while the contact lens is attached thereon so that a relative motion at the frequency of the acoustic energy takes place through contact points between edges of the outer concave portion of male half mold half 2 and the contact lens attached thereon.

Figure 6:
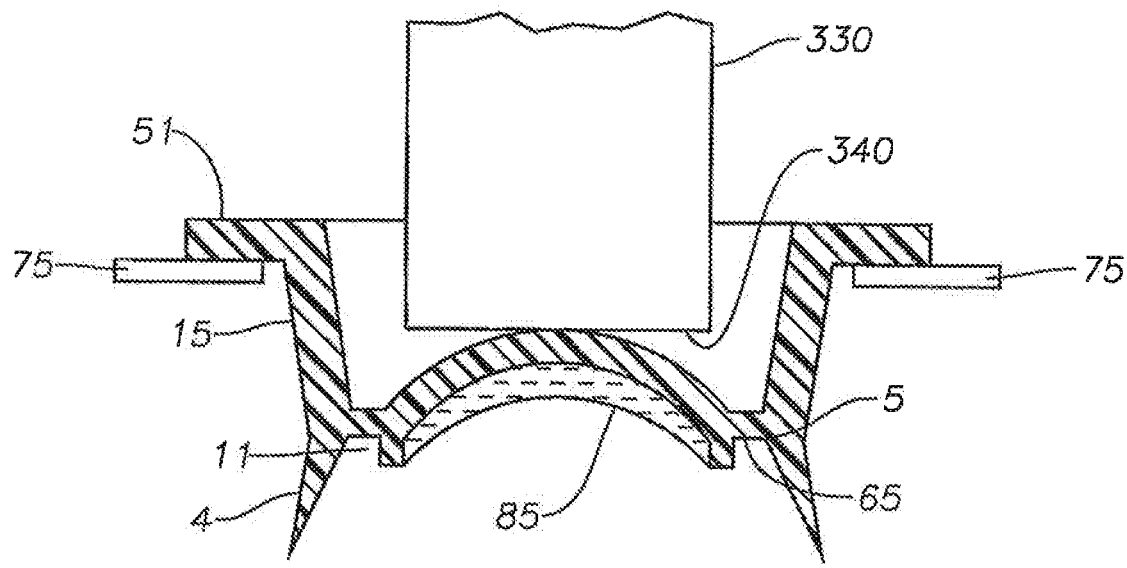
FIG. 6 illustrates a flat ultrasonic horn is sized to be approximately the outer diameter of the female mold half.

FIG. 6 illustrates an embodiment of the invention is shown wherein an ultrasonic horn (330) having a flat surface (340) is sized to be approximately the outer diameter of the female mold half (1) to contact the center area of the outer convex portion of the female mold half. The female mold half and the contact lens (85) attached thereon is held stationary by a position holder (75). The center portion of back surface (non-optical surface) of the female mold half (1) proximate the ultrasonic horn vibrates with the acoustical energy emitted from the ultrasonic horn (330) while the contact lens is attached thereon so that a relative motion at the frequency of the acoustic energy takes place between the female mold half and the contact lens attached thereon.

Figure 7A:
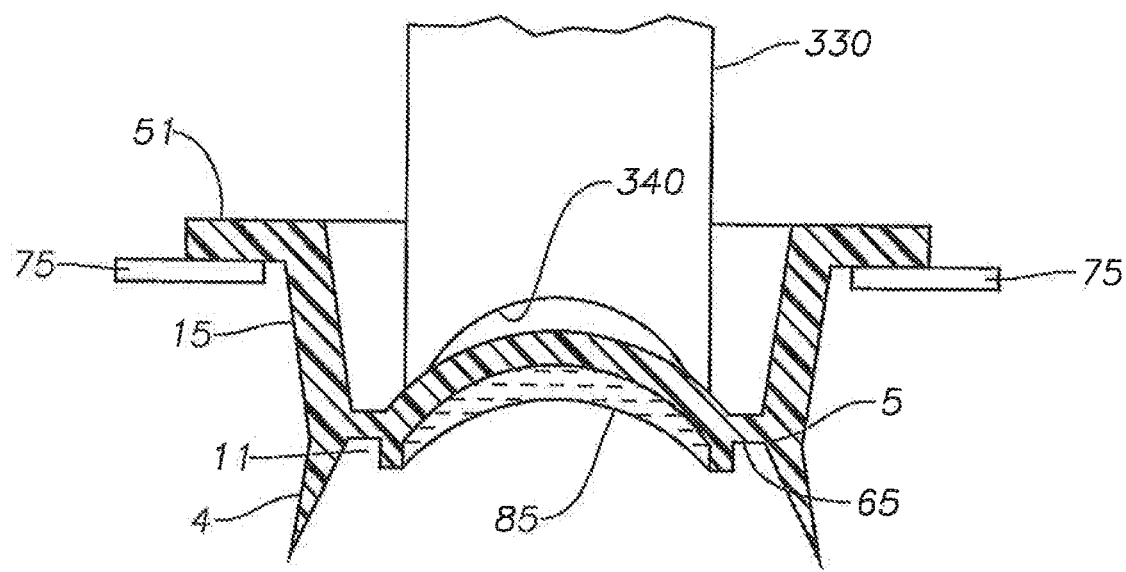
FIGS. 7A and 7B illustrate a concave ultrasonic horn seated within the outer convex portion of female half mold half.
Figure 7B:
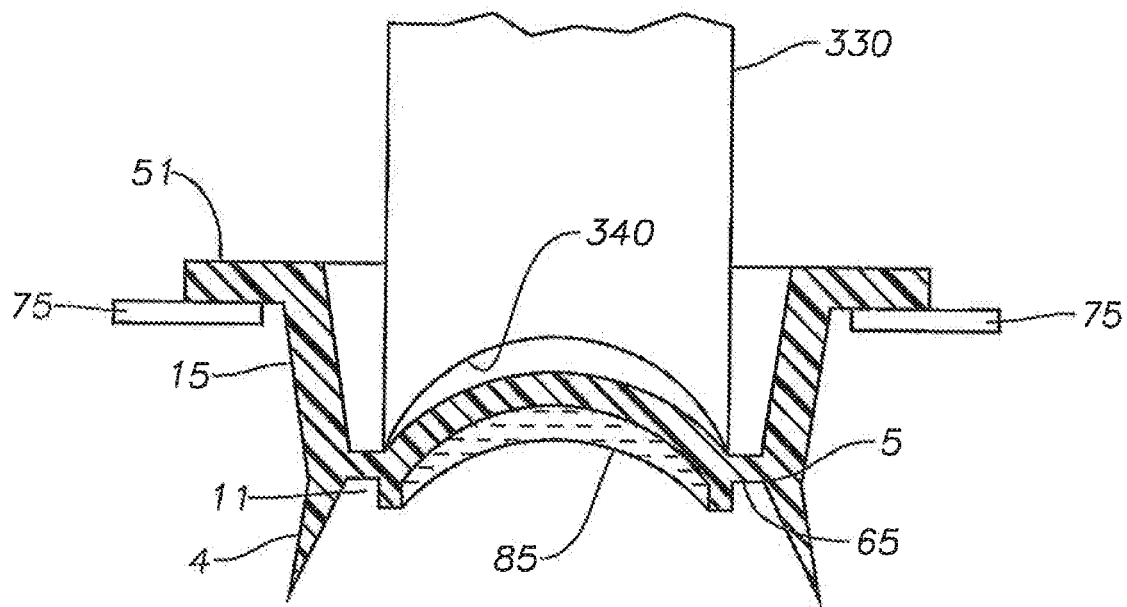

FIGS. 7A and 7B show an embodiment wherein an ultrasonic horn (330) having a concave surface (340) is of a size that allows it to extend within the outer convex portion of female half mold half (1) to contact the center area of the outer convex portion of the female mold half. The female mold half and the contact lens (85) attached thereon is held stationary by a position holder (75). FIG. 7A illustrates that the ultrasonic horn vibrates with the acoustical energy emitted from the ultrasonic horn (330) while the contact lens is attached thereon so that a relative motion at the frequency of the acoustic energy takes place through contact surface between inside of the outer convex portion of female half mold half 1 and the contact lens attached thereon. 7B illustrates that the ultrasonic horn vibrates with the acoustical energy emitted from the ultrasonic horn (330) while the contact lens is attached thereon so that a relative motion at the frequency of the acoustic energy takes place through contact points between edges of the outer concave portion of female half mold half 1 and the contact lens attached thereon.

Figure 8:
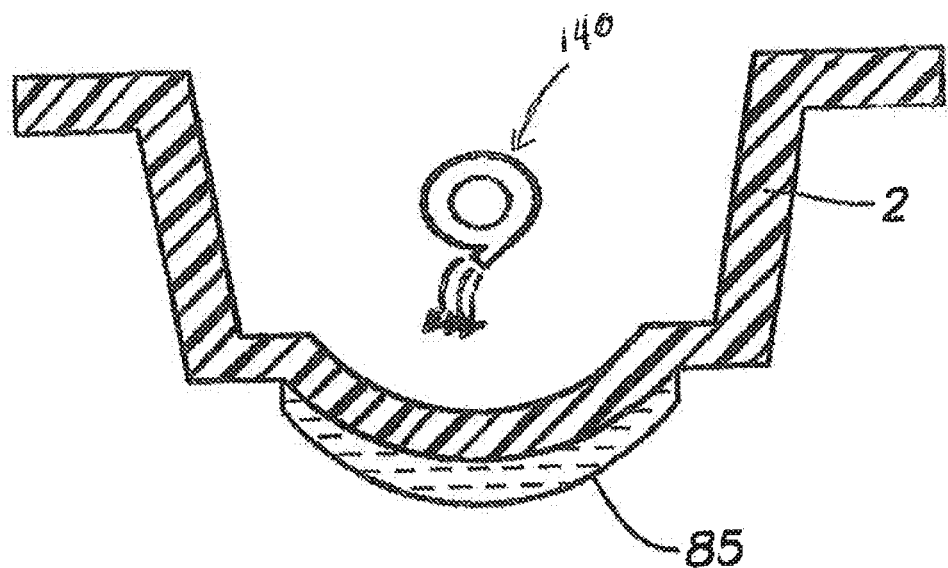
FIG. 8 illustrates a cold blower to cool the outer convex portion of female half mold half.

FIG. 8 illustrates an embodiment of the invention is shown wherein the lens-adhere mold half with the silicone hydrogel contact lens adhered thereon is cooled with a cold air blower (140), such as a VORTEC Cold Air Gun or the AirJet unit, both convert compressed air to a lower temperature, by blowing cold air onto the inside of the outer concave portion (non-optical side) of male half mold half (2) or by blowing cold air onto the surface of the silicone hydrogel contact lens, provided that a liquid nitrogen, liquid helium or solid carbon dioxide is not used to cool the lens-adhere mold half.

Figure 9:
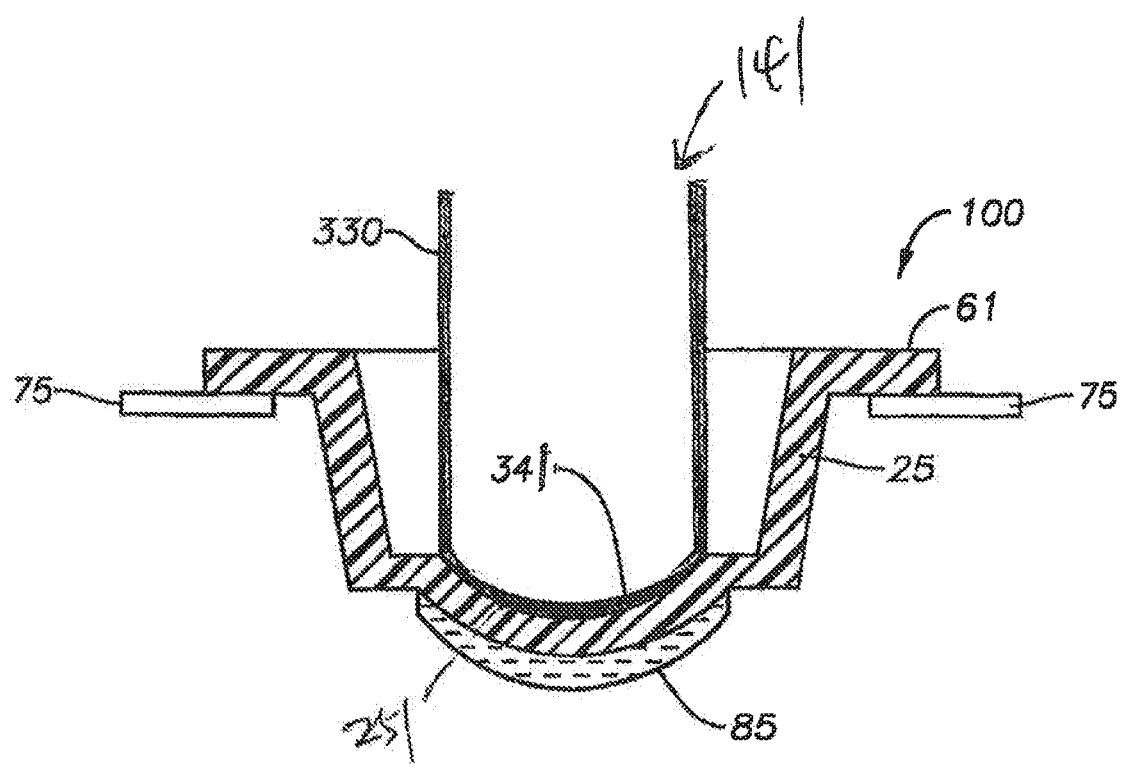
FIG. 9 illustrates a cold tube with a closed surface and with cold air inlet and outlet to cool the outer concave portion (non-optical side) of male half mold half.

FIG. 9 illustrates an embodiment of the invention is shown wherein the lens-adhere mold half with the silicone hydrogel contact lens adhered thereon is cooled through direct contact between the surface 341 of a cold device, such as a cold hollow tube 141 with a closed surface 341 at one end of the tube and the surface 251 of the inside of the outer concave portion (non-optical side) of male half mold half (2), provided that a liquid nitrogen, liquid helium or solid carbon dioxide is not used to cool the lens-adhere mold half. The temperature of the hollow tube with the closed surface 341 is reduced with a cold air blower (140), such as a VORTEC Cold Air Gun or the AirJet unit, both convert compressed air to a lower temperature, to provide temperature from minus 20 degree Celsius to minus 80, degree Celsius to blow cold air onto the inside of the tube through inlet 142 for about one to three seconds and cold air flowing out through outlet 143.

Figure 10:
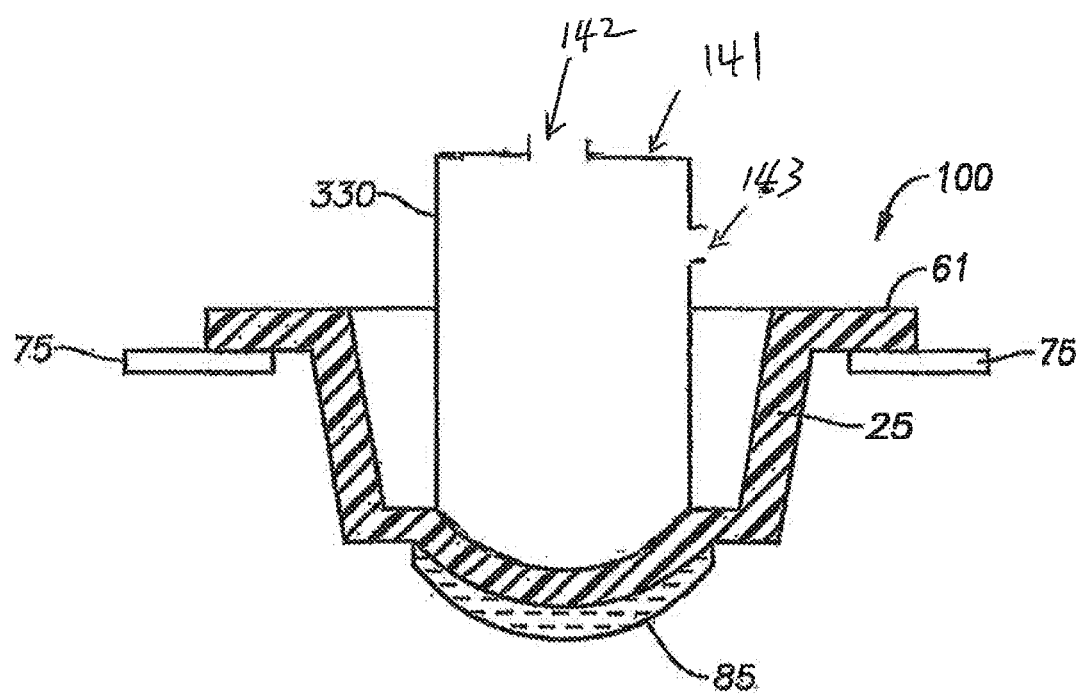
FIG. 10 illustrates a cold tube without a closed surface but with cold air inlet and outlet to cool the outer concave portion (non-optical) of male half mold half.

FIG. 10 illustrates an embodiment of the invention is shown wherein the lens-adhere mold half with the silicone hydrogel contact lens adhered thereon is cooled by flowing a cold air directed through a cold hollow tube 141 without a closed surface at one end of the tube directly to the inside of the outer concave portion (non-optical side) of male half mold half (2), provided that a liquid nitrogen, liquid helium or solid carbon dioxide is not used to cool the lens-adhere mold half. The cold air is generated by cold air blower (140), such as a VORTEC Cold Air Gun or the AirJet unit, both convert compressed air to a lower temperature, to provide temperature from minus 20 degree Celsius to minus 80, degree Celsius to blow cold air onto the inside of the tube through inlet 142 for about one to three seconds and cold air flowing out through outlet 143.

Furthermore, a Peltier device can be used to cool down the hollow tube. Thermoelectric coolers operate by the Peltier effect (which also goes by the more general name thermoelectric effect). The device has two sides, and when a DC electric current flows through the device, it brings heat from one side to the other, so that one side gets cooler while the other gets hotter. The "hot" side is attached to a heat sink so that it remains at ambient temperature, while the cool side goes below room temperature. In special applications, multiple coolers can be cascaded together for lower temperature, but overall efficiency drops significantly. The Peltier effect is the presence of heating or cooling at an electrified junction of two different conductors.

According to the present invention, the modification to the output part of the horn and the preferred parameters associated with operating the system are given in the following. The ultrasonic welding system is comprised of a power supply (300) which generates a frequency range from 15 kHz to 70 kHz by the use of solid state power devices. This high frequency electrical energy is supplied to a converter (320). This component changes the electrical energy into ultrasonic mechanical vibratory energy at the frequency of the converted electrical energy supply which is typically 15 kHz to 70 kHz. The vibratory ultrasonic acoustical energy is then transmitted through an amplitude modifying device called a booster (320). The booster is a passive (i.e., non-powered) device which is used to modify the output amplitude of the converter before it reaches the horn (330). The horn is shaped to horn having a flat surface, convex surface or a concave surface, etc (340) is an acoustical tool that transfers the vibratory energy directly to the non-optical surface of a mold half. The present invention is practiced with the above described apparatus as follows: an ultrasonic welding apparatus as described above, the specific system being used for the investigation is a Dukane iQ Series ES Servo Ultrasonic Welding Press System with a 30 kHz generator, 2:1 booster. The generator creates a user settable, high voltage (~1000 Vrms), 30 kHz signal that is applied to the transducer. The transducer expands and contract with this applied voltage and creates a mechanical vibration at the face of the transducer. This vibration is amplified by the booster and horn assembly. The end effect of the ultrasonic process is to produce a vertical displacement of the horn. The amount of vertical displacement is a factor of the following: frequency, booster gain, horn gain (horn design) and amplitude. According to the present patent application, the vertical displacement ranges from 20 to 160 micron, preferably between 80 to 140 micron, still more preferably between 100 to 120 micron. To maximize the effectiveness of the mechanical vibration on the part, the vibration needs to be applied in a prescribed manner.

To operate the Dukane Servo system, the ultrasonic horn is lowered to a point in space, where it begins to look for a reaction force equal to the trigger force set by the user. It will continue to move downward at prescribed speed over a short distance looking for that reaction force. When that force is achieved, the system will fire the ultrasonics. Once fired, the horn will seek to move to maintain that constant force. Force mode was chosen to deal with the normal positional variation you would encounter with different parts placed slightly differently from the previous part, as well as slight geometry variations from part to part. The generator output energy equals to the time integral of power.

In another aspect, the invention is directed to an apparatus for delensing a hydrogel contact lens from the lens adhering mold half, separating a molded hydrogel contact lens from a female mold half or a male mold half attached thereon, the apparatus comprising:
  means for holding the female mold half or the male mold half having hydrogel contact lens attached thereon stationary,
means for cooling the lens-adhere mold half with the silicone hydrogel contact lens adhered thereon; an ultrasonic energy horn is shaped to direct contact with at least one area of a non-optical surface of the female mold half or the male mold half having the molded hydrogel contact lens attached thereon,
  a power supply, a converter and a booster coupled to the horn to form a ultrasonic welding system for generating ultrasonic energy of a frequency and amplitude, and for a duration necessary to separate the molded hydrogel contact lens from the female mold half or the male mold half attached thereon.

Example 1

Chemicals

The following abbreviations are used in the following examples: VAZO 64 represents 2,2'-dimethyl-2,2'azodipropiononitrile; Nobloc is 2-[3-(2H-Benzotriazol-2-yl)-4-hydroxyphenyl] ethyl methacrylate from Aldrich; UV28 represents 2-{2'-Hydroxy-3'-tert-butyl-5'-[3'-methacryloyloxypropoxy]phenyl}-5-chloro-2H-benzotriazole; RB247 is Reactive Blue 247; PrOH represents 1-propanol; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent;

Preparation of CE-PDMS Macromer

In the first step, .alpha.,.omega.-bis(2-hydroxyethoxypropyl)-polydimethylsiloxane (Mn=2000, Shin-Etsu, KF-6001a) is capped with isophorone diisocyanate (IPDI) by reacting 49.85 g of .alpha.,.omega.-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40.degree. C., forming IPDI-PDMS-IPDI. In the second step, a mixture of 164.8 g of .alpha.,.omega.-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40.degree. C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum (2.times.10.sup.-2 mBar). Then, under an atmosphere of dry nitrogen, 320 g of distilled MEK is then added into the reactor and the mixture is stirred thoroughly. 0.235 g of DBTDL is added to the reactor. After the reactor is warmed to 45.degree. C., 45.86 g of IPDI are added through an addition funnel over 10 minutes to the reactor under moderate stirring. The reaction is kept for 2 hours at 60.degree. C. 630 g of KF-6002 dissolved in 452 g of distilled MEK are then added and stirred until a homogeneous solution is formed. About 0.235 g of DBTDL is added, and the reactor is held at about 55.degree. C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18.degree. C. to obtain CE-PDMS macromer with terminal methacrylate groups.

Preparation of Polymerizable Compositions

A lens formulation is prepared by dissolving components to have the following composition: 40% by weight of CE-PDMS macromer prepared in Example 2, 28% by weight of N-[tris(trimethylsiloxy)-silylpropyl]acrylamide (TRIS-Am), 32% by weight of N,N-dimethylacrylamide (DMA), 1.5% by weight of Nobloc, 0.5% by weight VAZO, 0.4% by weight of UV28, 0.01% by weight of RB247, and 5% by weight of 1-propanol.

Cast Molding

The formulation prepared above is introduced into a polypropylene molds. Then, the molds are dosed and thermally cured in an oven under nitrogen using the following temperature conditions: at 55° C. for 40 minutes; at 80° C. for 40 minutes; and at 100° C. for 40 minutes.

Mold Separation

Lens molds each with a molded silicone hydrogel contact lens precursor therein are mechanically opened as illustrated by FIG. 2 and described above. The molded unprocessed silicone hydrogel contact lens precursors adhere to the male mold halves.

Removing Lens Precursors from Lens-Adhered Mold Halves

Molded silicone hydrogel contact lens are removed (i.e., "delensed") from lens-adhered male mold halves by first cooling the lens-adhere mold half with the silicone hydrogel contact lens adhered thereon to a temperature of about from minus five to fifteen degree Celsius by applying a cold air of about minus twenty degree Celsius to the mold half for 2 to 10 second (FIG. 10), then using an ultrasonic welding apparatus as illustrated in FIG. 3. An ultrasonic horn made of stainless steel and having a shape shown in FIG. 4.

Lens molds each with a molded silicone hydrogel contact lens therein are mechanically opened as illustrated by FIG. 2 and described above. The molded silicone hydrogel contact lens adhere to the male mold halves.

The lens-adhere mold half with the silicone hydrogel contact lens adhered thereon is cooled with a cold air blower as illustrated by FIG. 8.
  bringing a shaped ultrasonic horn in direct contact with at least one area of a non-optical surface of the cooled lens-adhered mold half with the molded silicone hydrogel contact lens attached thereon.
  applying a ultrasonic vibrational energy to the at least one area of the non-optical surface of the lens-adhered mold half having the molded silicone hydrogel contact lens attached thereon so as to remove the molded silicone hydrogel contact lens from the lens-adhered mold half. Example process settings are provided as follow:

| Process Parameter | Setting |
| --- | --- |
| Generator Frequency | 30 or 40 kHz |
| Booster | 2:1 |
| Horn | 2:1 |
| Trigger Force | 100N |
| Energy | 0.1-40 J |

According to the present invention, Generator Frequency is operated between 15 kHz to 70 kHz, preferably between 20 kHz to 40 kHz, more preferably between 30 kHz to 40 kHz, inclusive. Trigger Force is operated between 1.0 N to 200N, preferably between 20 N to 150N, more preferably between 50 N to 110N, still more preferably between 75 N to 100N. Energy is operated between 0.1 J to 40 J, preferably between 0.5 J to 30 J, still more preferably between 1.0 J to 20 J. The duration of applying the ultrasonic vibration energy necessary to separate the molded hydrogel contact lens from the female mold half or the male mold half attached thereon is typically less than 10 seconds, preferably less than 5.0 seconds, more preferably less than 2.0 seconds, still more preferably less than 1.0 second.

Results:

| Trial | Sample size, N= | Yield, % |
| --- | --- | --- |
| 1 | 20 | 90 |
| 2 | 15 | 87 |
| 3 | 20 | 70 |
| 4 | 20 | 75 |
| 5 | 15 | 87 |

For the above trials, the average yield is 82 percent and process parameters are as follows: cooling the lens-adhere mold half with the silicone hydrogel contact lens adhered thereon to a temperature of about 3.5 degree Celsius by applying a cold air blower (VORTEC Cold Air Gun, or the AirJet unit, both convert compressed air to a lower temperature), delens the lens from the BC mold using the 30 kHz ultrasonic delenser with the curved horn and 2.0 booster using a force applied to the BC mold of 75-150 N, a delensing energy of 1-8 J, a delensing amplitude of 80-100%, and a delensing ramp up time of 20-50 ms. Comparing to the control which has the same operation conditions except of on cooling steps, the trial results is at least 50 percent higher. Please also note after cooling treatment, 100% of the molded silicone hydrogel contact lens are still adhered to the mold half.

It is understood that methods of manufacturing mold halves for cast molding a contact lens are generally well known to those of ordinary skill in the art. The process of the present invention is not limited to any particular method of forming a mold half. In fact, any method of forming a mold half can be used in the present invention. However, for illustrative purposes, the above discussion has been provided as one embodiment of forming mold halves that can be used in accordance with the present invention.

Various embodiments are evident. Although one mold (FIG. 1) is illustrated, the invention is in no way limited to this specific mold. A person skilled in the art can readily determine other molds for which the invention has applicability.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A method for producing contact lenses, comprising:
   a) providing a mold including a male mold half having a first molding surface and a female mold half having a second molding surface, wherein the male and female mold halves are configured to receive each other such that a mold cavity is formed between the first and second molding surfaces when the mold is closed;
   b) dispensing an amount of a silicone hydrogel lens-forming material into the female mold halves;
   c) mating the male and female mold halves to close the mold;
   d) curing thermally or actinically the silicone hydrogel lens-forming material located in the mold cavity, thereby forming a silicone hydrogel contact lens within the lens mold;
   e) separating the mold into the male and female mold halves, with the molded silicone hydrogel contact lens adhered on a lens-adhered mold half which is one of the male and female mold halves;
   f) cooling the lens-adhere mold half with the molded silicone hydrogel contact lens adhered thereon to a temperature between minus five degree Celsius and fifteen degree Celsius and provided that a liquid nitrogen, liquid helium or solid carbon dioxide is not used to cool the lens-adhere mold half, wherein the molded silicone hydrogel contact lens is not separated from the cooled lens-adhered mold half after the step of f);
   g) bringing a shaped ultrasonic horn in direct contact with at least one area of a non-optical surface of the cooled lens-adhered mold half with the molded silicone hydrogel contact lens attached thereon;
   h) applying a ultrasonic vibrational energy to the at least one area of the non-optical surface of the lens-adhered mold half having the molded silicone hydrogel contact lens attached thereon so as to release the molded silicone hydrogel contact lens from the lens-adhered mold half.

2. The method of claim 1, wherein the shaped ultrasonic horn is a flat ultrasonic horn.

3. The method of claim 1, wherein the shaped ultrasonic horn is a convex ultrasonic horn.

4. The method of claim 1, wherein the shaped ultrasonic horn is a concave ultrasonic horn.

5. The method of claim 1, wherein applying an ultrasonic vibrational energy is operated with a Generator Frequency between 15 kHz to 50 kHz.

6. The method of claim 1, wherein applying an ultrasonic vibrational energy is triggered by a force between 1.0 N to 150N.

7. The method of claim 1, wherein applying an ultrasonic vibrational energy produces a vertical displacement of the ultrasonic horn ranging from 20 to 160 micron.

8. The method of claim 1, wherein curing step is thermally curing.

9. The method of claim 1, wherein the cooling the lens-adhere mold half with a cold air blower to blow a cold air onto the non-optical side of the lens-adhere mold half.

10. The method of claim 1, wherein the cooling the lens-adhere mold half with a cold horn to directly contacting the non-optical side of the lens-adhere mold half.

11. The method of claim 10, wherein the cooling device is a shaped horn.

12. The method of claim 1, wherein cooling the lens-adhere mold half to a temperature between minus zero degree Celsius and twelve degree Celsius.

13. The method of claim 12, wherein the cooling the lens-adhere mold half to a temperature between two degree Celsius and ten degree Celsius.

14. The method of claim 13, wherein the cooling the lens-adhere mold half to a temperature between three degree and eight degree.

\* \* \* \* \*